United States Patent
Verdoorn et al.

(10) Patent No.: US 11,371,420 B2
(45) Date of Patent: Jun. 28, 2022

(54) COOLING ARRANGEMENT FOR COOLING CHARGE AIR OF A SUPERCHARGED INTERNAL COMBUSTION ENGINE

(71) Applicant: Dr. Ing. h.c. F. Porsche Aktiengesellschaft, Stuttgart (DE)

(72) Inventors: Werner Verdoorn, Ludwigsburg (DE); Vincenzo Bevilacqua, Ditzingen (DE); Alessandro Gallo, Besigheim (DE); Wolfgang Zücker, Ditzingen (DE); Peter Rothenberger, Philippsburg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/386,872

(22) Filed: Jul. 28, 2021

(65) Prior Publication Data
US 2022/0049644 A1 Feb. 17, 2022

(30) Foreign Application Priority Data
Aug. 11, 2020 (DE) ...................... 10 2020 121 053.1

(51) Int. Cl.
*F02B 29/04* (2006.01)
*F02B 39/10* (2006.01)

(52) U.S. Cl.
CPC ...... *F02B 29/0475* (2013.01); *F02B 29/0406* (2013.01); *F02B 29/0481* (2013.01); *F02B 39/10* (2013.01)

(58) Field of Classification Search
CPC .............. F02B 29/0481; F02B 29/0475; F02B 29/0406
See application file for complete search history.

(56) References Cited

U.S. PATENT DOCUMENTS

| 11,268,435 B2* | 3/2022 | De Avila Antonini ...................... F02B 37/04 |
| 2001/0054287 A1* | 12/2001 | Hoecker ................. F02M 26/08 123/562 |
| 2013/0283781 A1* | 10/2013 | Klingbeil ............ F02B 29/0481 60/605.1 |
| 2019/0186390 A1 | 6/2019 | Kelly et al. |

FOREIGN PATENT DOCUMENTS

| DE | 102009031845 A1 * | 1/2011 | ......... F02B 29/0406 |
| DE | 102015006572 A1 | 12/2015 | |
| DE | 102015208971 A1 * | 11/2016 | ......... F02B 29/0437 |
| DE | 202017107685 U1 | 1/2018 | |
| GB | 2129055 A * | 5/1984 | ......... F02B 29/0406 |
| WO | 2009080086 A1 | 7/2009 | |

* cited by examiner

*Primary Examiner* — Ngoc T Nguyen
(74) *Attorney, Agent, or Firm* — RatnerPrestia

(57) ABSTRACT

A cooling arrangement for cooling charge air of a supercharged internal combustion engine. In a charge-air line that leads to the internal combustion engine, there are provided a compressor arrangement, which has at least one compressor stage, and an expansion arrangement, which has at least one expansion stage for lowering the pressure level and thus for cooling the charge air. A cooling device is provided between the compressor arrangement and the expansion arrangement. The at least one compressor stage and the at least one expansion stage are connected in series and are respectively connected in terms of drive to an electric motor. The compressor arrangement has at least two compressor stages connected in parallel.

7 Claims, 1 Drawing Sheet

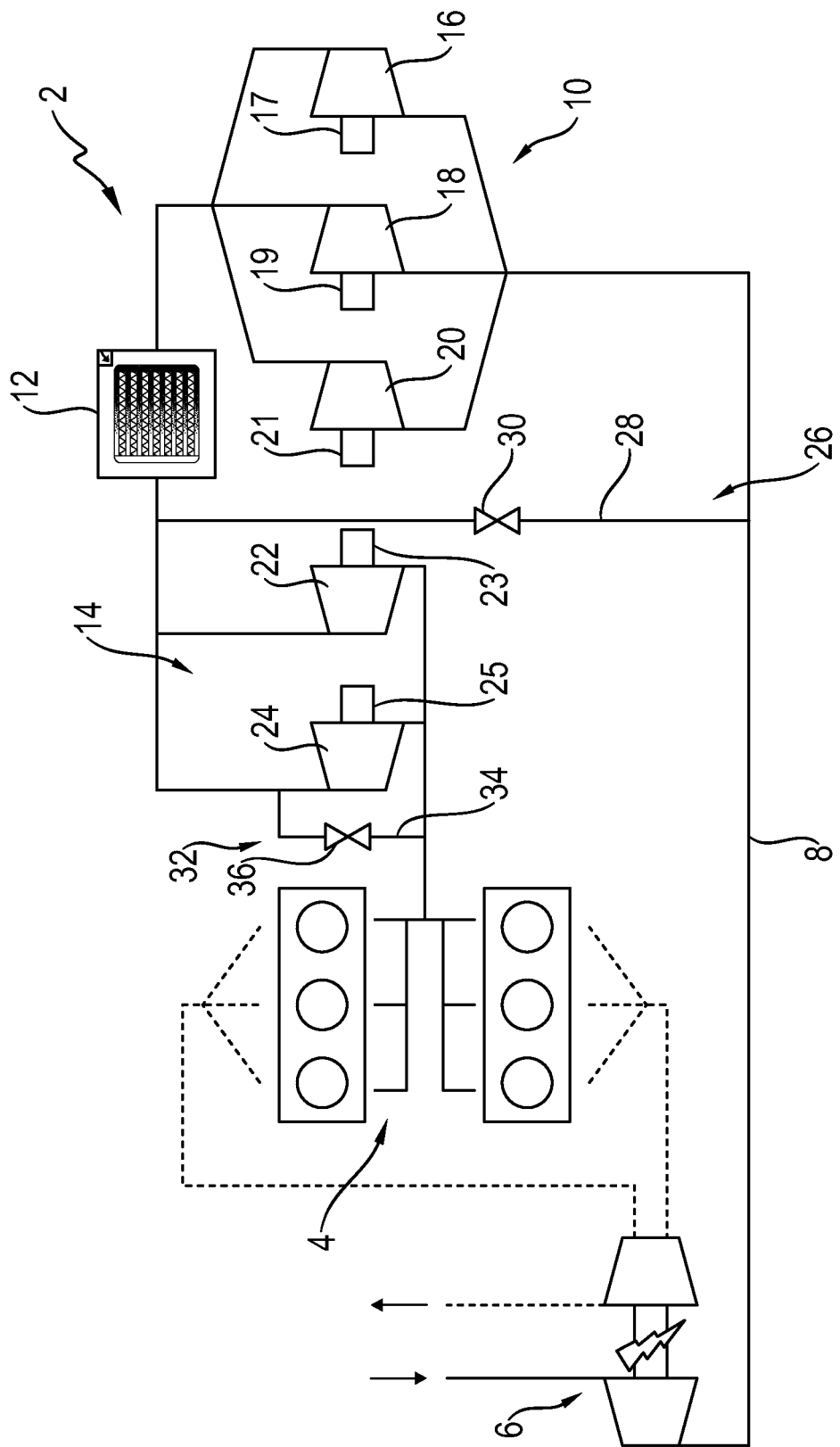

COOLING ARRANGEMENT FOR COOLING CHARGE AIR OF A SUPERCHARGED INTERNAL COMBUSTION ENGINE

CROSS-REFERENCE TO RELATED APPLICATION

This application claims priority to German Patent Application No.: 10 2020 121 053.1, filed Aug. 11, 2020, the content of such application being incorporated by reference herein in its entirety.

FIELD OF THE INVENTION

The invention relates to a cooling arrangement for cooling charge air of a supercharged internal combustion engine, wherein, in a charge-air line that leads to the internal combustion engine, there are provided a compressor arrangement, which has at least one compressor stage, and an expansion arrangement, which has at least one expansion stage for lowering the pressure level and thus for cooling the charge air, wherein a cooling device is provided between the compressor arrangement and the expansion arrangement, wherein the at least one compressor stage and the at least one expansion stage are connected in series and are respectively connected in terms of drive to an electric motor.

BACKGROUND OF THE INVENTION

Turbocharged internal combustion engines, in particular Otto internal combustion engines, require cooling of the charge air that is conducted in a charge-air line from the compressor of a turbocharger to the internal combustion engine, in order that the combustion air is not too hot, which has an extremely adverse effect on the knocking tendency of the internal combustion engine. To solve this problem, it is known to use so-called charge-air coolers, through which the compressed charge air is conducted and is cooled. A disadvantage of these charge-air coolers is that, for a relatively high level of cooling power, they must have a relatively large cooling surface, for which the required structural space is not available in modern motor vehicles. It is also known for the compressed charge air to be cooled through the use of an air-conditioning compressor. This type of cooling however has the disadvantage that this in turn has a major adverse effect on the energy balance of the motor vehicle. A generic cooling arrangement is known from the German utility model specification DE 20 2017 107 685 U1, which is incorporated herein by reference, which discloses a cooling arrangement in the case of which a compressor arrangement with a compressor stage and an expansion arrangement with an expansion stage are provided in a charge-air line that leads to the internal combustion engine. A cooling device is provided between the compressor arrangement and the expansion arrangement, wherein the compressor stage and the expansion stage are connected in series and are respectively connected in terms of drive to an electric motor. Here, the expansion arrangement brings the charge air to a considerably lower pressure level, such that said charge air is cooled. Such an arrangement has little flexibility with regard to the structural-space-specific and/or drive-specific requirements.

SUMMARY OF THE INVENTION

A compressor arrangement has at least two compressor stages connected in parallel. Very precise tuning of the expansion level can be implemented through the connection of the compressor stages in parallel. By virtue of the fact that both the expansion and compressor stages are electrically operated independently of one another, particularly precise and efficient control of the cooling arrangement with regard also to an exhaust-gas turbocharger is furthermore possible.

In a particularly advantageous embodiment, the expansion arrangement has at least two expansion stages. In this way, the cooling arrangement as a whole can be made even more compact, and the outlet temperature of the charge air to be fed to the internal combustion engine can be even more finely tuned.

The cooling device may advantageously be in the form of a charge-air cooler.

By virtue of the fact that the compressor arrangement has a first bypass arrangement in relation to the at least one compressor stage, it is also possible, in operating situations in which charge air at a relatively high temperature is required, to bypass the compressor arrangement and thus simultaneously save the energy for operating the compressor arrangement. Here, the first bypass arrangement may be fluidically connected to the charge-air line upstream or downstream of the cooling device.

In the same way, the expansion arrangement may also have a second bypass arrangement in relation to at least one expansion stage. Here, this bypass arrangement reduces the load of the exhaust-gas turbocharger compressor in certain operating situations.

Owing to the cooling arrangement according to aspects of the invention, the compressor stage can be in the form of a radial, axial, screw-type or spiral compressor. Here, the two or more compressor stages may also be of different form. The expansion stage may also be in the form of a turbine, piston machine, etc. In this way, the cooling arrangement according to aspects of the invention can be configured in a very flexible manner, and can be tuned to the respective internal combustion engine and to the available structural space.

BRIEF DESCRIPTION OF THE DRAWINGS

FIG. 1 shows a schematic illustration of a cooling arrangement according to aspects of the invention.

DETAILED DESCRIPTION OF THE INVENTION

FIG. 1 shows, in a schematic view, a cooling arrangement 2 for cooling charge air of a supercharged internal combustion engine 4. The supercharging is performed in a known manner by means of one or more turbomachines 6. Here, the cooling arrangement 2 is provided in a charge-air line 8 that leads, in a known manner, to the internal combustion engine 4.

In the present exemplary embodiment, the cooling arrangement 2 has a compressor arrangement 10, a cooling device 12 and an expansion arrangement 14. The compressor arrangement 10, the cooling device 12, which in this case is in the form of a charge-air cooler, and the expansion arrangement 14 are connected in series as viewed in a flow direction. Here, the compressor arrangement 10 is constructed from three compressor stages 16, 18, 20 connected in parallel. These compressor stages 16, 18, 20 are in this case in the form of radial compressors for the sake of clarity; they may however also, if necessitated by the structural space or the requirements, be in the form of axial, screw-type or spiral compressors. Here, a combination of different compressor stages is also possible. The compressor stages 16, 18, 20 can each be driven by a dedicated electric motor 17, 19, 21. In this way, it is possible for each compressor stage 16, 18, 20 to be individually controlled and accordingly tuned exactly to the demanded power profiles of the cooling arrangement 2.

By contrast, in this exemplary embodiment, the expansion arrangement 14 has two expansion stages 22, 24 connected in parallel. These expansion stages 22, 24 are illustrated here as turbines for the sake of clarity, though they may also both or individually be of some other form, for example in the form of a piston machine, for structural space reasons or owing to particular power demands. Here, too, each expansion stage 22, 24 can be driven by a dedicated electric motor 23, 25. A further advantage of the electrical separation of the compressor arrangement 10 from the expansion arrangement 14 is in this case that, in the case of a in the case of a positive power difference between the expansion arrangement 14 and the compressor arrangement 10, electrical energy can be recuperated.

Furthermore, a first bypass arrangement 26 is composed of a first bypass line 28 and a first bypass valve 30, and a second bypass arrangement 32 is composed of a second bypass line 34 and a second bypass valve 36. The first bypass arrangement 26 serves, in operating situations in which charge air at a relatively high temperature is required, for circumventing the compressor arrangement 10 and thus simultaneously saving the energy for operating the compressor arrangement 10. The second bypass arrangement 34 can, when required, reduce the load of an exhaust-gas turbocharger compressor of the turbomachine 6 in certain operating situations.

What is claimed:

1. A cooling arrangement for cooling charge air of a supercharged internal combustion engine, said cooling arrangement comprising:
   a compressor arrangement, which has at least two compressor stages connected in parallel, and is connected to a charge-air line that leads to the internal combustion engine,
   an expansion arrangement, which has at least one expansion stage for lowering a pressure level of the charge air and for cooling the charge air, and is connected to the charge-air line that leads to the internal combustion engine, and
   a cooling device disposed between the compressor arrangement and the expansion arrangement,
   wherein the at least two compressor stages and the at least one expansion stage are connected in series and are respectively connected in terms of drive to an electric motor.

2. The cooling arrangement as claimed in claim 1, wherein the expansion arrangement has at least two expansion stages.

3. The cooling arrangement as claimed in claim 1, wherein the cooling device is a charge-air cooler.

4. The cooling arrangement as claimed in claim 1, wherein the compressor arrangement has a first bypass arrangement in relation to the at least one compressor stage.

5. The cooling arrangement as claimed in claim 4, wherein the expansion arrangement has a second bypass arrangement in relation to the at least one expansion stage.

6. The cooling arrangement as claimed in claim 1, wherein the compressor stage is a radial, axial, screw-type or spiral compressor.

7. The cooling arrangement as claimed in claim 1, wherein the expansion stage is a turbine or piston machine.

\* \* \* \* \*